United States Patent
Sawabe

(10) Patent No.: US 7,551,561 B2
(45) Date of Patent: Jun. 23, 2009

(54) PACKET COMMUNICATION TERMINAL

(75) Inventor: Kazuhide Sawabe, Katano (JP)

(73) Assignee: Panasonic Corporation, Osaka (JP)

( * ) Notice: Subject to any disclaimer, the term of this patent is extended or adjusted under 35 U.S.C. 154(b) by 634 days.

(21) Appl. No.: 10/986,937

(22) Filed: Nov. 15, 2004

(65) Prior Publication Data

US 2005/0129036 A1  Jun. 16, 2005

Related U.S. Application Data

(63) Continuation-in-part of application No. PCT/JP2004/001597, filed on Feb. 13, 2004.

(30) Foreign Application Priority Data

| May 15, 2003 | (JP) | .............................. 2003-137831 |
| Aug. 18, 2004 | (JP) | .............................. 2004-238773 |

(51) Int. Cl.
  *H04J 3/14* (2006.01)
(52) U.S. Cl. ...................... 370/235; 370/445
(58) Field of Classification Search ........................ None
  See application file for complete search history.

(56) References Cited

U.S. PATENT DOCUMENTS

| 6,611,529 | B1 * | 8/2003 | Krishnakumar et al. ..... 370/437 |
| 2003/0137989 | A1 * | 7/2003 | Nagai ......................... 370/455 |
| 2006/0053459 | A1 * | 3/2006 | Simerly et al. .............. 725/105 |

FOREIGN PATENT DOCUMENTS

| JP | 59-086940 | 5/1984 |
| JP | 62-092544 | 4/1987 |
| JP | 64-023644 | 1/1989 |
| JP | 3-268534 | 11/1991 |
| JP | 7-264216 | 10/1995 |
| JP | 11-355324 | 12/1999 |

* cited by examiner

*Primary Examiner*—Kevin C Harper
*Assistant Examiner*—Rhonda Murphy
(74) *Attorney, Agent, or Firm*—Wenderoth, Lind & Ponack, L.L.P.

(57) ABSTRACT

The present invention discloses a communication terminal included in a network system in which a plurality of communication terminals are connected to a single transmission medium. A priority information acquisition section (11) acquires priority information contained in a currently transmitting packet. A priority determination section (13) determines, based on priority information contained in a to-be-sent packet and the priority information acquired by the priority information acquisition section (11), which one of the to-be-sent packet and the currently transmitting packet should be given priority. A jam signal generation section (14) generates a jam signal if it is determined by the priority determination section (13) that the to-be-sent packet is given priority. A communication section (15) sends out the to-be-sent packet on the transmission medium after the jam signal stops and before the currently transmitting packet is sent out again.

12 Claims, 11 Drawing Sheets

FIG. 6

| PRIORITY VALUE | PRIORITY LEVEL | PACKET TYPES |
|---|---|---|
| 7 | HIGHEST PRIORITY | CONTROL PACKET |
| 6 | HIGH PRIORITY | REAL-TIME AUDIO PACKET |
| 5 | MID PRIORITY | REAL-TIME VIDEO PACKET |
| 4 ~ 0 | LOW PRIORITY | OTHER PACKETS |

FIG. 7

| PREAMBLE | DESTINATION ADDRESS | SOURCE ADDRESS | TYPE | DATA | FCS |
|---|---|---|---|---|---|

PACKET COMMUNICATION TERMINAL

This application is a continuation-in-part of International Application PCT/JP2004/001597, filed Feb. 13, 2004.

BACKGROUND OF THE INVENTION

1. Field of the Invention

The present invention relates to a packet communication terminal, and more particularly to a packet communication terminal for sending and receiving a packet over a LAN (Local Area Network) such as Ethernet(R).

2. Description of the Background Art

As an access method used in Ethernet(R) and the like, CSMA/CD (Carrier Sense Multiple Access with Collision Detection) is widely used. In CSMA/CD, upon sending a packet, a communication terminal detects a signal on a transmission medium and checks whether communication is currently being performed. If communication is not being performed, the communication terminal is allowed to send the packet. In the case where a plurality of communication terminals start sending packets substantially at the same time, packet collision occurs on the transmission medium. If a communication terminal detects a collision, the communication terminal stops sending a packet and retransmits the packet after a random time so as to prevent another collision.

Further, there exists a technique for sending a packet (emergency packet) which needs to be sent urgently over a LAN which performs communication using the above-described method. According to the technique, if there is a packet currently being sent on the transmission medium upon sending an emergency packet, a communication terminal to send the emergency packet deliberately causes a collision. The communication terminal then sends the emergency packet thereof while other terminals wait a random time for retransmission. This enables the communication terminal to send the emergency packet on a high-priority basis over the other communication terminals.

In the above-described CSMA/CD, however, while a communication terminal is sending a packet, other communication terminals cannot send packets until the sending of the packet has been completed. Therefore, in the case where communication terminals other than the communication terminal which is currently sending a packet need to immediately send packets (emergency packets), the communication terminals cannot send the emergency packets until the sending of the packet being performed by the communication terminal has been completed.

FIG. 13 is a diagram for describing a method of sending a packet in a conventional network system. The network system shown in FIG. 13 is configured such that communication terminals 91 to 94 are connected to a network 95. In FIG. 13, the situation, for example, where the communication terminal 91 is in the process of sending a packet to the communication terminal 93 is assumed. In this situation, even if a packet to be sent (the dashed-line arrow shown in FIG. 13) arises in the communication terminal 92, the communication terminal 92 cannot send the packet until the sending of the packet being in the process of communication (the solid-line arrow shown in FIG. 13) has been completed.

In addition, in the above-described technique where a collision is deliberately caused, the communication terminal only determines whether a packet to be sent therefrom is an emergency packet. That is, whether the packet on the transmission medium is an emergency packet is not considered. Thus, if the packet on the transmission medium is an emergency packet (from a viewpoint of other communication terminals), the emergency packet is broken down. This will be described using the example of FIG. 13. Assume that in the situation where the communication terminal 91 is in the process of sending a packet to the communication terminal 93, an emergency packet to be sent (the dashed-line arrow shown in FIG. 13) arises in the communication terminal 92. In this case, with the technique where a collision is deliberately caused, the emergency packet of the communication terminal 92 is always sent regardless of whether the packet currently being sent (the solid-line arrow shown in FIG. 13) is an emergency packet. Accordingly, in the conventional technique, there is a possibility that an emergency packet sent from a communication terminal may be broken down by another communication terminal, and thus an emergency packet cannot always be sent reliably.

SUMMARY OF THE INVENTION

Therefore, an object of the present invention is to provide a packet communication terminal capable of reliably sending a high priority packet.

To achieve the above object, the present invention has the following aspects. Specifically, a first aspect of the present invention is directed to a packet communication terminal (hereinafter simply referred to as the "communication terminal") included in a network system in which a plurality of communication terminals are connected to a single transmission medium. Here, a packet to be sent out on the transmission medium for communication between the communication terminals contains priority information about a priority for sending the packet. The communication terminal comprises a priority information acquisition section, a priority determination section, a jam signal generation section, and a packet sending out section. The priority information acquisition section acquires priority information contained in a currently transmitting packet which is being sent out on the transmission medium. The priority determination section determines, based on priority information contained in a to-be-sent packet which is to be sent to another communication terminal from the communication terminal and the priority information acquired by the priority information acquisition section, which one of the to-be-sent packet and the currently transmitting packet should be given priority. The jam signal generation section generates a jam signal for causing a packet collision on the transmission medium, if it is determined by the priority determination section that the to-be-sent packet is given priority. The packet sending out section sends out, if it is determined by the priority determination section that the to-be-sent packet is given priority, the to-be-sent packet on the transmission medium after the jam signal stops and before the currently transmitting packet is sent out again. On the other hand, if it is determined by the priority determination section that the currently transmitting packet is given priority, the packet sending out section sends out the to-be-sent packet after sending of the currently transmitting packet has been completed.

A second aspect of the present invention is directed to a communication terminal included in a network system in which a plurality of communication terminals are connected to a single transmission medium. Here, a packet to be sent out on the transmission medium for communication between the communication terminals contains priority information about a priority for sending the packet. The communication terminal comprises a priority information acquisition section, a priority determination section, a data-amount measurement section, a jam signal generation section, and a packet sending out section. The priority information acquisition section acquires priority information contained in a currently transmitting packet which is being sent out on the transmission medium. The priority determination section determines, based on priority information contained in a to-be-sent packet which is to be sent to another communication terminal from the communication terminal and the priority information acquired by the priority information acquisition section, which one of the to-be-sent packet and the currently transmitting packet should be given priority. The data-amount measurement section measures an amount of a portion of data in the currently transmitting packet which has already been received. The jam signal generation section generates a jam signal for causing a packet collision on the transmission medium, if it is determined by the priority determination section that the to-be-sent packet is given priority and if the amount of data does not exceed a predetermined amount of data. The packet sending out section sends out, if it is determined by the priority determination section that the to-be-sent packet is given priority, the to-be-sent packet on the transmission medium after the jam signal stops and before the currently transmitting packet is sent out again, and sends out, if it is determined by the priority determination section that the currently transmitting packet is given priority, the to-be-sent packet after sending of the currently transmitting packet has been completed.

According to the above, a determination is made as to which one of the currently transmitting packet and the to-be-sent packet should be given priority. Further, the determination is made based on priority information contained in each packet. Accordingly, an accurate determination can be made of a packet to be given priority between a packet to be sent from the communication terminal and a packet to be sent from another communication terminal. Specifically, even if the to-be-sent packet of the communication terminal needs to be sent immediately, if the currently transmitting packet of another communication terminal which is already in the process of being transmitted at that point needs to be sent on a high-priority basis, the packet to be truly given priority (the currently transmitting packet in this case) is given priority. Thus, according to the above-described communication terminals, a high priority packet can be reliably sent.

In the case where the network system further includes a communication terminal which sends out on the transmission medium a packet which does not contain priority information, the priority determination section may perform the following operations. Specifically, if the currently transmitting packet does not contain priority information, the priority determination section may set a priority for the currently transmitting packet to a predetermined level, and then determine which one of the to-be-sent packet and the currently transmitting packet should be given priority.

According to the above, a packet having an unknown priority can be handled as a packet having a predetermined priority. Further, by setting the lowest level for the predetermined priority, a packet having a priority is given priority to be sent over a packet having an unknown priority.

The communication terminal may further comprise an elapsed time measurement section. The elapsed time measurement section measures an elapsed time from when the currently transmitting packet is sent out on the transmission medium. In this case, the jam signal generation section generates a jam signal if it is determined by the priority determination section that the to-be-sent packet is given priority and if the elapsed time does not exceed a predetermined period of time.

According to the above, if the elapsed time exceeds a predetermined time, a jam signal is not generated and the currently transmitting packet is sent before the to-be-sent packet is sent. Specifically, if sending of the currently transmitting packet has been proceeded to a certain level, the communication terminal waits until the sending of the currently transmitting packet has been completed, and then sends the to-be-sent packet. Note that in the case where the elapsed time is not measured, even if a major part of the data in the currently transmitting packet has been sent, if a packet having a higher priority is generated, the sending of the currently transmitting packet is stopped. Accordingly, in this case, the currently transmitting packet needs to be sent all over again, whereby the efficiency of packet sending in the entire network system may become very low. Contrary to this, by measuring an elapsed time, it is possible to determine whether sending of the currently transmitting packet is almost completed, and thus the currently transmitting packet caimot be broken down just before its sending operation is completed. Accordingly, the efficiency of packet sending in the entire network system can be improved.

In the case where the priority information indicates a priority, the priority determination section may determine, between the to-be-sent packet and the currently transmitting packet, a packet having a higher priority as the packet to be given priority. Alternatively, in the case where the priority information is contained in a packet and indicates a destination communication terminal or a source communication terminal, the communication terminals each may further include a priority information table storage section. The priority information table storage section stores a priority information table which shows association between the priority information and a priority of a packet which contains the priority information. In this case, the priority determination section may derive priorities of the to-be-sent packet and the currently transmitting packet using the priority information table, and then determine a packet having a higher priority as the packet to be given priority.

As described above, in the case where the priority information indicates a priority itself, the communication terminal can easily make a priority determination. Alternatively, in the case where the priority information indicates a destination address or a source address, even if the packet does not contain information indicating a priority, a priority determination can be made. Accordingly, a communication terminal which does not send a packet containing information indicating a priority can be implemented in a network system which performs packet sending according to priorities.

Further, if a jam signal is sent out on the transmission medium by another communication terminal while the to-be-sent packet is being sent out, the packet sending out section may send out the to-be-sent packet after the communication terminals have waited their respective random times. Alternatively, if a jam signal is sent out on the transmission medium by another communication terminal while the to-be-sent packet is being sent out, the packet sending out section may send out the to-be-sent packet after sending of the currently transmitting packet has been completed. According to this, even if sending of the to-be-sent packet is stopped by a higher priority packet generated by another communication terminal while the to-be-sent packet is being sent, after the sending of the packet by another communication terminal has been completed, the to-be-sent packet can be reliably sent. Further, a range which the random time can take may be set such that a possibility that the random time becomes short as the priority of the to-be-sent packet increases. According to this, since the higher the priority of the packet is, the shorter the wait time of the packet becomes, and thus an unnecessary data transmission and an unnecessary priority determination process can be minimized.

Note that the present invention can be realized in the form of a program; by storing the program on a storage medium and migrating the same, the program can be easily executed on another independent computer system (communication terminal).

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an exemplary priority information table in the first embodiment;

FIG. 7 is a diagram illustrating an exemplary packet format which does not contain priority information;

DESCRIPTION OF THE PREFERRED EMBODIMENTS

Figure 1:
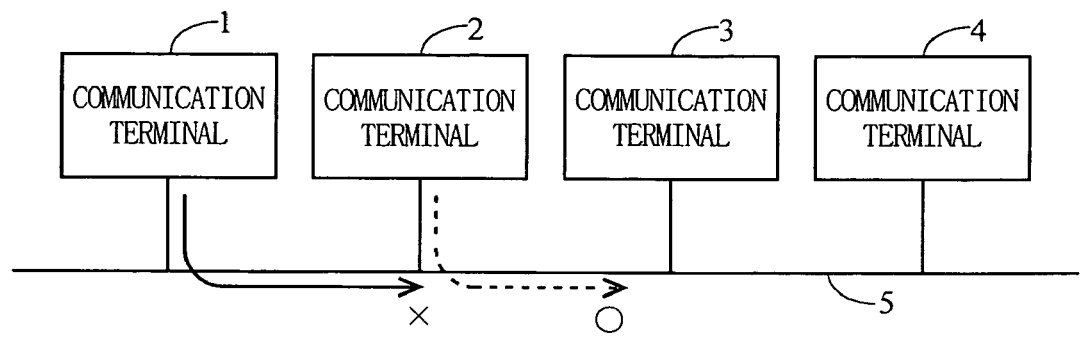
FIG. 1 is a diagram illustrating a network system including communication terminals according to the present invention.

Before describing detailed embodiments of the present invention, a general description of the present invention is provided for an easy understanding of the present invention. FIG. 1 is a diagram illustrating a network system including communication terminals according to the present invention. The network system shown in FIG. 1 is configured such that communication terminals 1 to 4 are connected to a network 5. In FIG. 1, the situation, for example, where the communication terminal 1 is in the process of sending a packet to the communication terminal 3 is assumed. In this situation, when a packet to be sent (the dashed-line arrow shown in FIG. 1) arises in the communication terminal 2, the communication terminal 2 determines which one of the packet in the process of being sent (the solid-line arrow shown in FIG. 1) and the packet to be sent therefrom should be given priority. Then, as a result of the determination, if it is determined that the packet to be sent from the communication terminal 2 is given priority, the communication terminal 2 causes a collision to stop the sending of the packet in the process of being sent, and sends the packet thereof first (see FIG. 1). On the other hand, as a result of the determination, if it is determined that the packet in the process of being sent is given priority, the communication terminal 2 sends out the packet thereof after the sending of the packet in the process of being sent has been completed. In the present invention, by determining the packet priority based on a determination result such as that described above, a high priority packet is reliably determined and sent first.

First Embodiment

Figure 2:
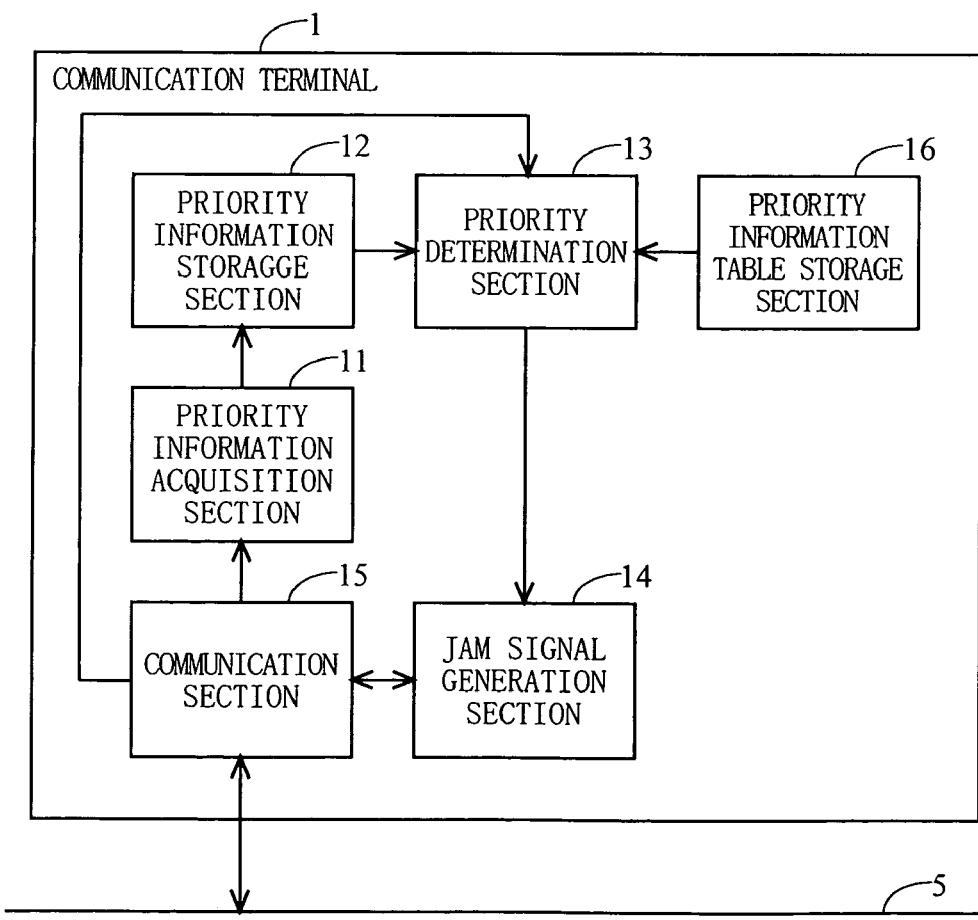
FIG. 2 is a block diagram illustrating a configuration of a communication terminal according to a first embodiment.

FIG. 2 is a block diagram illustrating a communication terminal constituting a network system according to a first embodiment. In FIG. 2, the network system is configured such that a communication terminal 1 is connected to a network 5. Note that although FIG. 2 shows only one communication terminal, the network 5 actually has a plurality of communication terminals connected thereto. The network 5 is a communication network composed of a transmission medium. Note also that in the following embodiments 1 to 3, the sending and receiving of a packet is performed by CSMA/CD and using Ethernet(R) as a transmission medium.

In FIG. 2, the communication terminal 1 includes a priority information acquisition section 11, a priority information storage section 12, a priority determination section 13, a jam signal generation section 14, a communication section 15, and a priority information table storage section 16. The communication section 15 reads a packet on the network 5 or sends a packet to another communication terminal via the network 5. Further, the communication section 15 detects a packet collision occurring on the network 5.

When a packet is sent out on the network 5 from any of the communication terminals included in the network system, the communication section 15 detects the packet having been sent out. The priority information acquisition section 11 acquires, through the communication section 15, priority information contained in the packet having been sent out on the network 5 from the packet. The priority information is information about a priority for sending a packet. That is, the priority is information indicating priority order for sending a packet. Specifically, the priority may be expressed as a numeric value (a priority value which will be described later) indicating priority order, or may be information indicating a level (a priority level which will be described later) which indicates priority order such as "high priority" or "low priority". In the first embodiment, as the priority information, a priority value is contained in a packet. Note that, in the following description, the packet being sent out on the transmission medium (network 5), i.e., the packet currently being transmitted is referred to as a "currently transmitting packet". The priority information storage section 12 stores the priority information acquired by the priority information acquisition section 11. The stored priority information is used when the communication terminal 1 performs the process of sending a packet.

When a packet to be sent (hereinafter referred to as a "to-be-sent packet") arises in the communication terminal 1, the priority determination section 13 determines which one of the to-be-sent packet and the currently transmitting packet should be given priority (i.e., should be sent on a high-priority basis), based on priority information contained in the to-be-sent packet and the priority information contained in the currently transmitting packet. Note that in the first embodiment a priority information table is used for making such a determination. The priority information table contains information in which priority values are associated with priority levels. The priority information table is stored in the priority information table storage section 16. Note that the specific contents of the priority information table are shown in FIG. 6, which will be described later. The jam signal generation section 14 generates a jam signal in accordance with the result provided by the priority determination section 13. The jam signal is a signal to be sent out to the transmission medium so as to cause a packet collision on the transmission medium. Specifically, the jam signal generation section 14 generates a jam signal to deliberately cause a collision. Note that the jam signal may be equivalent to a jam signal to be generated when a collision occurs with CSMA/CD which is performed in Ethernet(R).

The operation of the communication terminal 1 according to the first embodiment will be described below. The processing performed by the communication terminal 1 is roughly divided into processing related to receiving a packet and processing related to sending a packet. These processing operations are performed asynchronously.

Figure 3:
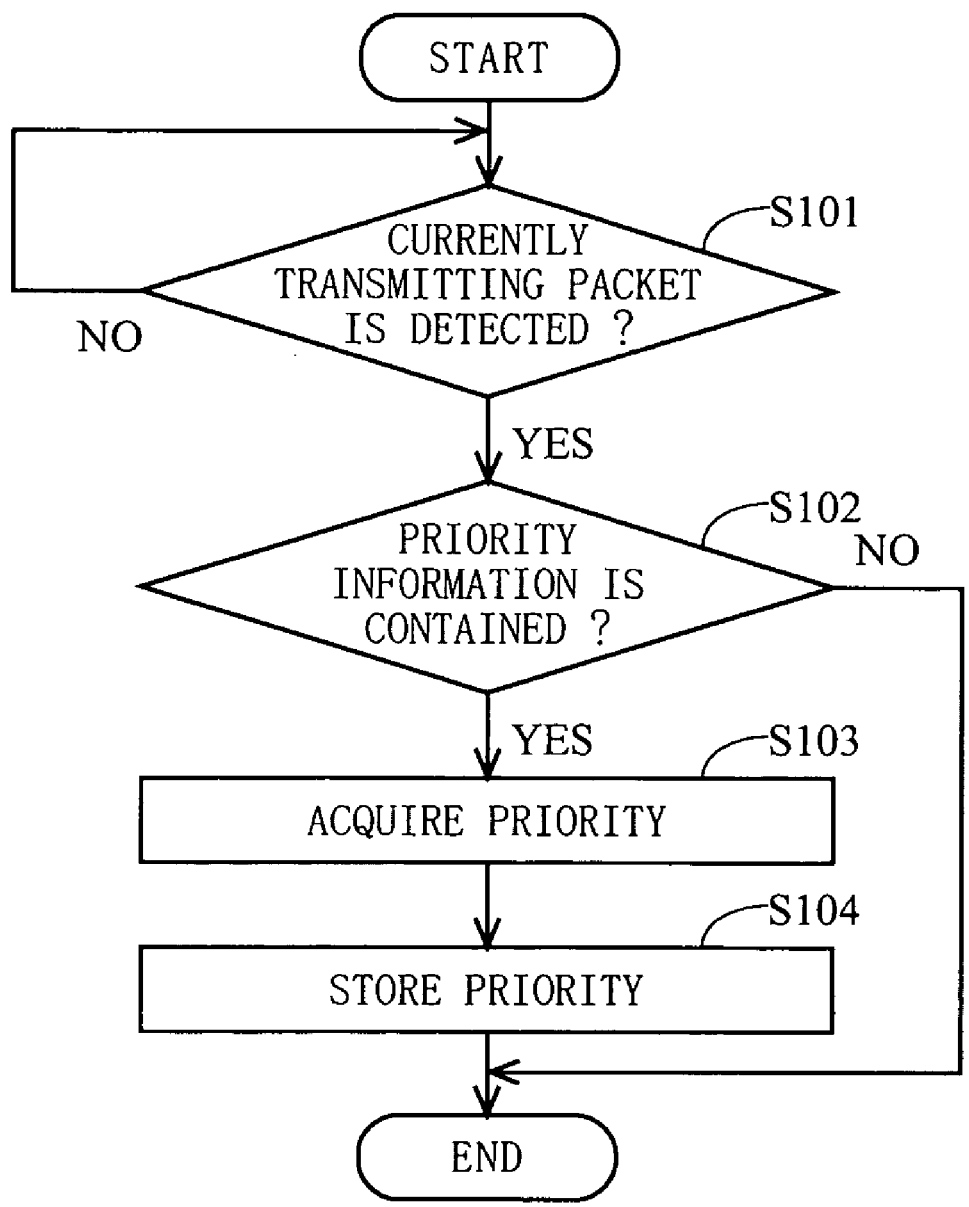
FIG. 3 is a flowchart showing the flow of processing related to receiving a packet, which is performed by the communication terminal.

FIG. 3 is a flowchart showing the flow of processing related to receiving a packet, which is performed by the communication terminal 1. The processing related to receiving a packet is the processing of detecting a currently transmitting packet and acquiring priority information contained in the currently transmitting packet. In FIG. 3, first, the communication section 15 determines whether a packet on the transmission medium (i.e., the currently transmitting packet) has been detected (step S101). Specifically, the communication section 15 monitors an Ethernet(R) cable which is the transmission medium and determines whether a preamble which is the start section of the packet has been detected.

Figure 4:
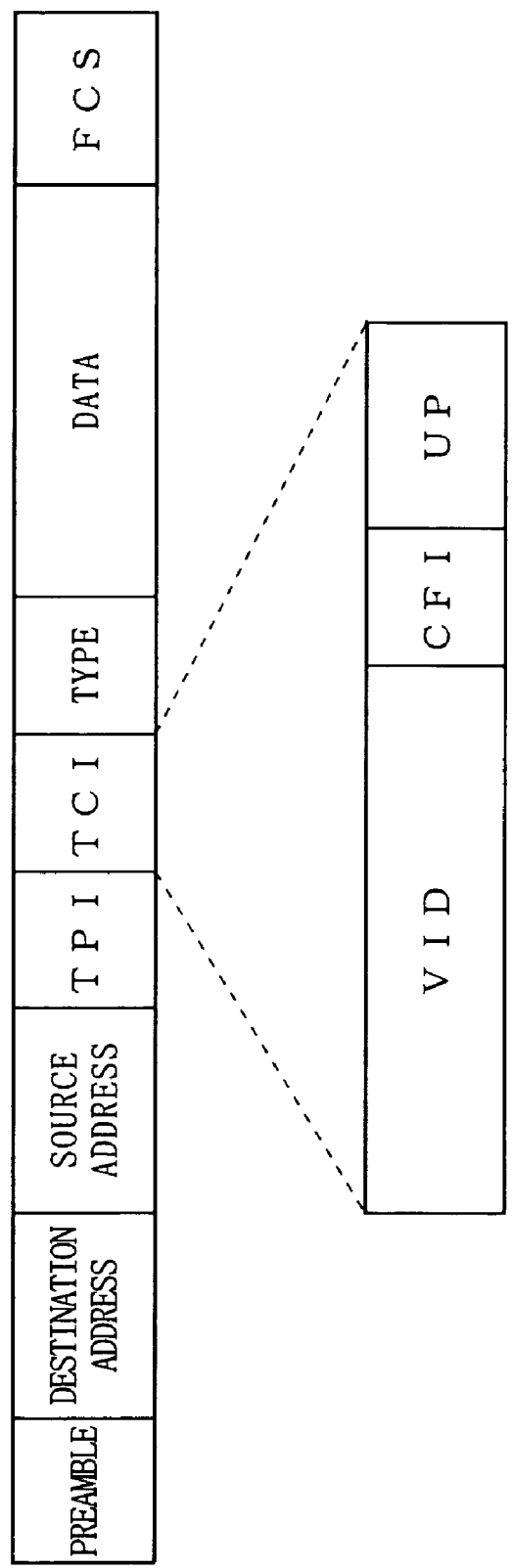
FIG. 4 is a diagram illustrating an exemplary packet format used in the first embodiment.

FIG. 4 is a diagram illustrating an exemplary packet format used in the first embodiment. In the first embodiment, a VLAN (Virtual Local Area Network) tagged format specified by IEEE 802.1Q is used. At step S101, by detecting the preamble (8 bytes) of a packet shown in FIG. 4, the packet can be received. Note that similarly in the case of using a packet without a VLAN tag, by detecting the preamble, the packet can be received. As described above, the method of receiving the currently transmitting packet is the same as that normally performed in Ethernet(R).

Referring back to the description of FIG. 3, if it is determined at step S101 that the currently transmitting packet has been detected, the communication section 15 receives and passes the currently transmitting packet to the priority information acquisition section 11. In response to this, the process of step S102 is performed by the priority information acquisition section 11. On the other hand, if the currently transmitting packet has not been detected, the process of step S101 is repeated. That is, the communication section 15 waits for the currently transmitting packet to be detected, and once the currently transmitting packet is detected, the process of step S102 is performed.

Next, the priority information acquisition section 11 determines whether the received currently transmitting packet contains priority information (step S102). In the case of the example of FIG. 4, the determination at step S102 can be made by checking whether the TPI (Tag Control Identifier) field (2 bytes) shown in FIG. 4 has a value of 0x81-00. If it is determined at step 102 that the currently transmitting packet does not contain priority information, the processing shown in FIG. 3 completes. On the other hand, if the currently transmitting packet contains priority information, the process of step S103 is performed.

If the determination result at step S102 is affirmative, the priority information acquisition section 11 acquires priority information contained in the currently transmitting packet (step S103). In the first embodiment, a User-Priority (indicated as "UP" in FIG. 4) field (3 bits) included in a TCI (Tag Control Information) field (2 bytes) shown in FIG. 4 corresponds to the priority information. That is, at step S103, the priority information acquisition section 11 acquires priority information by acquiring the User-Priority field. Note that in the first embodiment the 3-byte User-Priority field contains a priority value. The priority value is expressed as any numeric value between 0 and 7, and the greater the numeric value, the higher the priority. The acquired priority information (any numeric value between 0 and 7) is stored in the priority information storage section 12 (step S104). By performing the above-described steps, the processing shown in FIG. 3 completes. Normally, in Ethernet(R), if a packet is addressed to a given terminal, the given terminal performs a host layer process, and if a packet is not addressed to a given terminal, the given terminal does not perform any process. However, as described above, in the packet receiving processing according to the first embodiment, each time a packet is sent out on the transmission medium, regardless of whether the packet is addressed to a given terminal or to another terminal, the given terminal acquires priority information of the packet.

Figure 5:
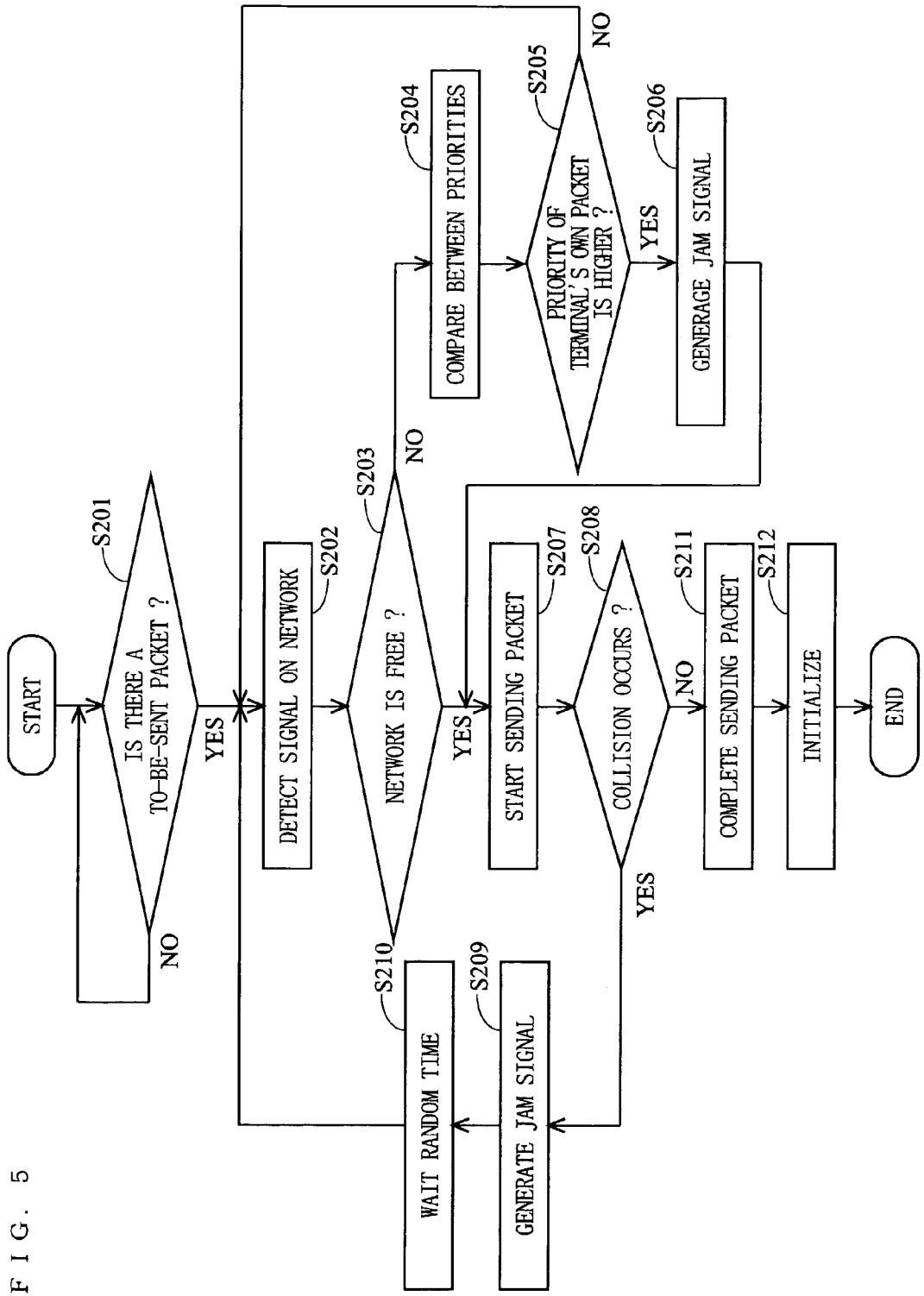
FIG. 5 is a flowchart showing the flow of processing related to sending a packet, which is performed by the communication terminal.

FIG. 5 is a flowchart showing the flow of processing related to sending a packet, which is performed by the communication terminal 1. The processing related to sending a packet is the processing of determining the timing at which the communication terminal 1 sends a to-be-sent packet, based on a priority of a currently transmitting packet and a priority of the to-be-sent packet.

In FIG. 5, first, the communication section 15 determines whether there is a to-be-sent packet in the communication terminal 1 (whether a packet to be sent to another communication terminal is generated in the communication terminal 1) (step S201). If it is determined at step S201 that there is a to-be-sent packet, the communication section 15 performs the process of step S202. On the other hand, if there is no to-be-sent packet, the communication section 15 repeats the process of step S201. That is, the communication section 15 waits for a to-be-sent packet to be generated, and once a to-be-sent packet is generated, the communication section 15 performs the process of step S202.

Next, the communication section 15 detects a signal on the network 5 (step S202), and then determines whether the network 5 is free (step S203). The determination at step S203 can be made by detecting the preamble of a currently transmitting packet, as is step S101. Specifically, if the preamble is detected, it means that there is a currently transmitting packet on the network 5, and thus it is determined that the network 5 is not free. The determination result is notified to the priority determination section 13. In response to the notification, the process of step S204 is performed by the priority determination section 13. On the other hand, if the preamble is not detected, it means that there is no currently transmitting packet on the transmission medium, and thus it is determined that the transmission medium is free. In this case, the process of step S207 is performed by the communication section 15.

If the determination at step S203 is negative, the priority determination section 13 compares between the priority of the currently transmitting packet and the priority of the to-be-sent packet (step S204). In the first embodiment, the comparison at step S204 is made using the priority levels to which the priority values are converted, but not using priority values contained in the packets. Accordingly, the determination at step S204 is made based on a priority information table stored in the priority information table storage section 16, as well as on priority information stored in the priority information storage section 12 and priority information contained in the to-be-sent packet. The determination process of step S204 will be described in detail below.

FIG. 6 is a diagram showing an exemplary priority information table in the first embodiment. As shown in FIG. 6, in the priority information table, priority values, priority levels, and packet types are stored so as to be associated with each other. As described above, the priority value is expressed as any numeric value between "0" and "7". In addition, in the first embodiment, the priority level is divided into four stages: "highest priority", "high priority", "mid priority", and "low priority" in ascending order of priority. Note that here the priority level is divided into four stages, but is not limited thereto. In addition, the packet types are associated with the respective priority levels.

In FIG. 6, a control packet is assigned a priority level of "highest priority". In this case, the packet is generated such that its priority information is expressed as a numeric value of "7". A real-time audio packet is assigned "high priority" and a real-time video packet is assigned "mid priority". The priority information of the real-time audio packet is expressed as a numeric value of "6" and the priority information of the real-time video packet is expressed as a numeric value of "5". Other packets are assigned "low priority". The priority information of other packets is expressed as any numeric value between "0" and "4". Note that in the first embodiment, the priority information table is predetermined such that all communication terminals have common contents. Note also that the priority assignment is not limited to that described above.

Referring back to the description of FIG. 5, in the determination process at step S204, by using the priority information table shown in FIG. 6, a comparison between the priority of the currently transmitting packet and the priority of the to-be-sent packet is made. Specifically, the priority level of the currently transmitting packet is derived from the priority value contained in the currently transmitting packet, and the priority level of the to-be-sent packet is derived from the priority value of the to-be-sent packet. The priority value of the currently transmitting packet is stored in the priority information storage section 12 by performing the processing shown in FIG. 3. Thus, the priority determination section 13 can derive the priority level of the currently transmitting packet using the priority value stored in the priority information storage section 12 and the priority information table. On the other hand, the to-be-sent packet also contains a priority value as well as the currently transmitting packet. Thus, the priority determination section 13 can derive the priority level of the to-be-sent packet using the priority information of the to-be-sent packet and the priority information table. At step S204, the priority determination section 13 compares between the currently transmitting packet and the to-be-sent packet using the priority levels derived in the manner described above.

Subsequently, based on the comparison result at step S204, the priority determination section 13 determines whether the packet the communication terminal 1 wants to send (i.e., the to-be-sent packet) is given priority (step S205). Specifically, as a result of the comparison at step S204, if the priority level of the to-be-sent packet is higher than that of the currently transmitting packet, the priority determination section 13 determines that the to-be-sent packet is given priority. On the other hand, if the priority level of the to-be-sent packet is the same as or lower than that of the currently transmitting packet, the priority determination section 13 determines that the to-be-sent packet is not given priority (i.e., the currently transmitting packet is given priority).

For example, suppose the case where the packet currently being sent on the transmission medium (i.e., the currently transmitting packet) is an FTP (File Transfer Protocol) packet for transferring a file, and the packet the communication terminal 1 wants to send (i.e., the to-be-sent packet) is a real-time audio packet such as that used in VoIP (Voice over IP), for example. In this case, the priority value of the currently transmitting packet is "4" or lower. Here, it is assumed that the priority value of the currently transmitting packet is "4". Thus, the priority information to be acquired by the processing shown in FIG. 3 is stored as "4" in the priority information storage section 12. On the other hand, the priority value of the to-be-sent packet is "6". Thus, the priority level of the to-be-sent packet is "high priority". Since the priority level of the currently transmitting packet is "low priority", it can be seen that in this example the to-be-sent packet should be sent on a high-priority basis.

If it is determined at step S205 that the currently transmitting packet is given priority, the process of step S202 is performed. In this case, until the sending of the currently transmitting packet has been completed and the network 5 has become free, the processes of steps S202, S203, S204, and S205 are repeated. In another embodiment, the communication terminal 1 may wait, after step S205, for the network 5 to become free and then return to the process of step S202. On the other hand, if it is determined at step S205 that the to-be-sent packet is given priority, the priority determination section 13 allows the jam signal generation section 14 to generate a jam signal (step S206). The jam signal is sent out on the network 5 through the communication section 15. By this, a collision occurs on the network 5 and accordingly the sending of the currently transmitting packet is stopped.

At step S207, the communication section 15 starts sending the to-be-sent packet. That is, the communication section 15 sends out the to-be-sent packet on the network 5 which is the transmission medium. Note that if a jam signal is generated at step S206, the process of step S207 is performed immediately after the jam signal ends. By performing the processes of steps S206 and S207, the packet to be sent by the communication terminal 1 (i.e., the to-be-sent packet) is transmitted on the network 5, instead of the packet sent by another communication terminal (i.e., the currently transmitting packet).

Subsequent to the step S207, the communication section 15 monitors for a collision on the transmission medium and determines whether a collision has occurred (step S208). Here, a collision occurs in the case where while the communication terminal 1 is sending a packet, another communication terminal (a communication terminal other than the communication terminal 1) attempts to send a packet having a higher priority level than the packet sent out by the communication terminal 1. If it is determined at step S208 that a collision has occurred, the communication section 15 allows the jam signal generation section 14 to generate a jam signal (step S209) and waits a random time (step S210). Thereafter, the to-be-sent packet is retransmitted (steps S202 to S207).

On the other hand, if at step S208 a collision has not occurred and the sending of the to-be-sent packet has been completed (step S211), the priority information stored in the priority information storage section 12 is initialized (step S212). Specifically, the communication section 15 notifies the priority information acquisition section 11 that the sending of the to-be-sent packet has been completed. In response to the notification, the priority information acquisition section 11 sets the content stored in the priority information storage section 12 to "0". In this manner, the processing shown in FIG. 5 completes.

As described above, according to the first embodiment, the communication terminal determines which one of the currently transmitting packet and the to-be-sent packet should be given priority, whereby a high priority packet can be reliably sent on a high-priority basis. For example, in the case where the to-be-sent packet has a higher priority than the currently transmitting packet, the communication terminal can send the to-be-sent packet on a high-priority basis over the currently transmitting packet. On the other hand, in the case where the currently transmitting packet having a higher priority than the to-be-sent packet is already being sent, the communication terminal can send the currently transmitting packet on a high-priority basis without breaking down the currently transmitting packet.

Second Embodiment

Now, a communication terminal according to a second embodiment will be described. The communication terminal according to the second embodiment takes into account the case where a communication terminal which does not contain a priority (a terminal which does not perform a sending operation according to priorities) is included in the network system. Note that the communication terminal and the configuration of the communication terminal are the same as those shown in FIG. 2. In the second embodiment, the processing of receiving a packet and the processing of sending a packet are different from those of the first embodiment. Therefore, the following mainly describes the difference between the first embodiment and the second embodiment.

FIG. 7 is a diagram illustrating an exemplary packet format which does not contain priority information. The packet shown in FIG. 7 is an Ethernet(R) version 2 packet. As is the packet shown in FIG. 4, in the case of the packet shown in FIG. 7, by detecting the preamble, the packet can be received. In addition, the determination as to whether a priority is contained can be made on a packet which does not have a priority, such as that shown in FIG. 7, (step S102) by checking the type field shown in FIG. 7. Specifically, if the type field shown in FIG. 7 has a value other than 0x81-00, it is determined that the packet does not have a priority. For example, in the case of IP (Internet Protocol), the type field has a value of 0x08-00. In other words, the type field stores information indicating whether the packet has a priority.

Figure 8:
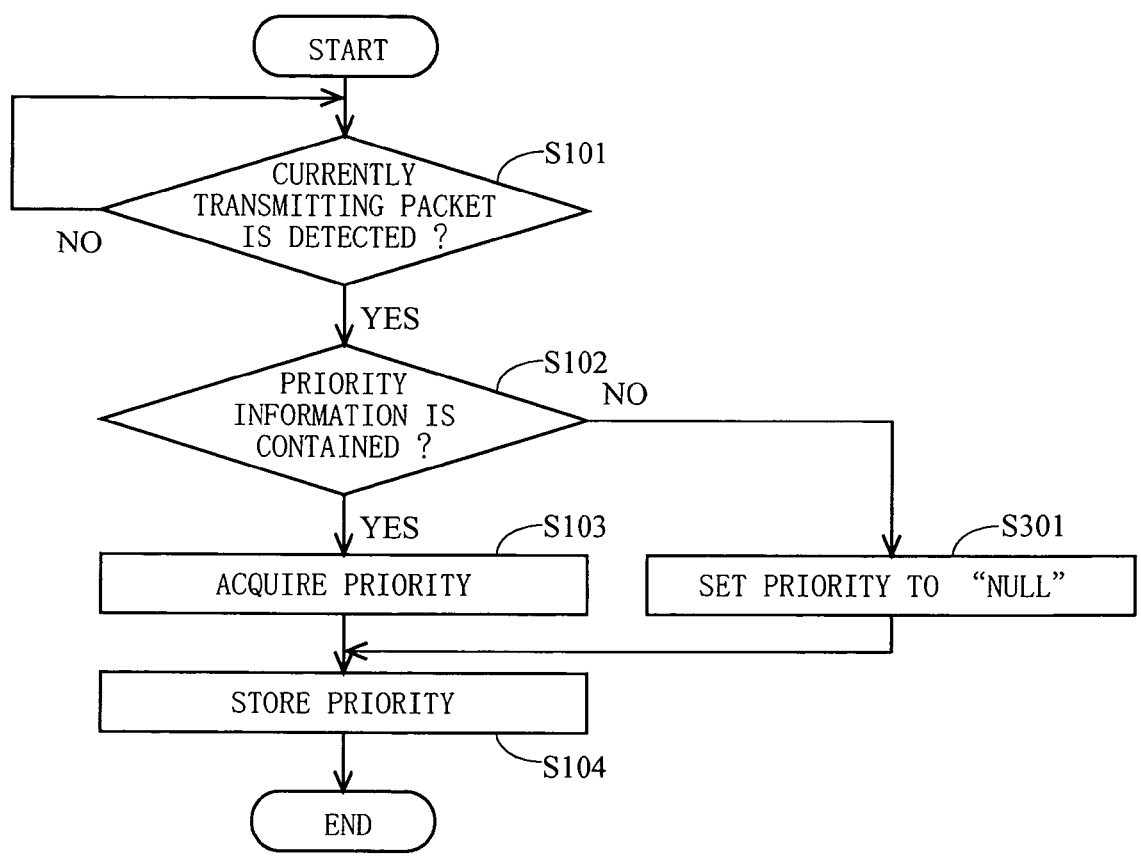
FIG. 8 is a flowchart showing the flow of processing related to receiving a packet in a second embodiment, which is performed by a communication terminal.

FIG. 8 is a flowchart showing the flow of processing related to receiving a packet in a second embodiment, which is performed by a communication terminal. Note that in FIG. 8 the steps indicating the same operations as those in FIG. 3 are designated by the same step numbers, and the description thereof will be omitted. In the second embodiment, if it is determined at step S102 that the currently transmitting packet does not contain priority information, the priority information acquisition section 11 stores in the priority information storage section 12 information indicating "no priority" (step S301). In this case, in the priority information storage section 12, "NULL", for example, is stored. After step S301, the processing shown in FIG. 8 completes. Note that in the first embodiment if it is determined at step S102 that the currently transmitting packet does not contain priority information, no information is stored in the priority information storage section 12. In the second embodiment, on the other hand, if a packet which does not contain priority information is detected, information indicating "no priority" is stored.

Figure 9:
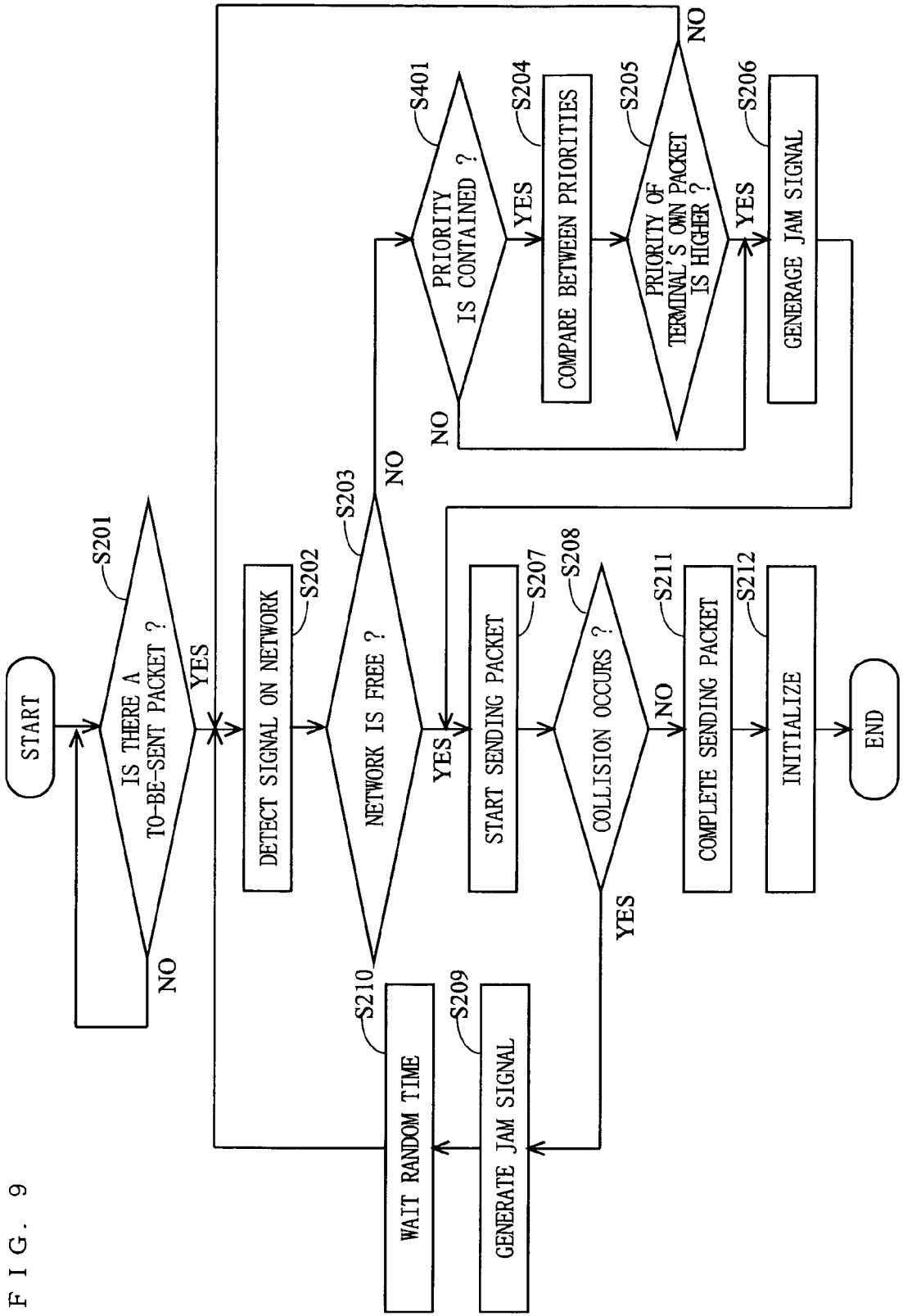
FIG. 9 is a flowchart showing the flow of processing related to sending a packet in the second embodiment, which is performed by the communication terminal.

FIG. 9 is a flowchart showing the flow of processing related to sending a packet in the second embodiment, which is performed by the communication terminal. Note that in FIG. 9 the steps indicating the same operations as those in FIG. 5 are designated by the same step numbers, and the description thereof will be omitted. In the second embodiment, if the determination at step S203 is negative, the priority determination section 13 determines whether the currently transmitting packet contains a priority (step S401). This determination is made by referring to the information stored in the priority information storage section 12. Specifically, if the priority value is stored in the priority information storage section 12, it is determined that the currently transmitting packet contains a priority. In this case, the process of step S204 is performed. On the other hand, if "NULL" is stored in the priority information storage section 12, it is determined that the currently transmitting packet does not contain a priority. In this case, the process of the step S206 is performed. That is, in the second embodiment, if "NULL" is stored in the priority information storage section 12, the communication terminal 1 skips processes (steps S204 and S205) which are performed by the priority determination section 13, and allows the jam signal generation section 14 to generate a jam signal. In this manner, in the second embodiment, if the currently transmitting packet does not contain a priority, a jam signal is generated without comparing priorities, and thus the to-be-sent packet is always sent on a high-priority basis.

As described above, in the second embodiment, even if there is a communication terminal which does not have a priority (a terminal which does not perform a sending operation according to priorities), packet sending can be performed according to priorities.

Note that in the second embodiment, at the time of initialization at step S212, the communication terminal may store "NULL" in the priority information storage section 12 instead of storing a priority value. In addition, although in the second embodiment the communication terminal sets, at step S301, "NULL" for the priority information storage section 12, in another embodiment the communication terminal may set a priority value (e.g., "0") for the priority information storage section 12. This configuration can also be applied to a communication terminal which does not have a priority.

Third Embodiment

Next, a communication terminal according to a third embodiment will be described. In the communication terminal according to the third embodiment, the elapsed time from when the currently transmitting packet is sent out on the transmission medium is measured. Then, if the measured elapsed time exceeds a predetermined period of time, even if the to-be-sent packet has a higher priority, the communication terminal continues to send the currently transmitting packet. That is, in the third embodiment, if sending of a certain amount of data in the entire currently transmitting packet has been completed, even if a higher priority packet is generated while sending is in process, the sending of the currently transmitting packet is given priority. This avoids resending a packet whose sending operation is almost completed, and accordingly an efficient packet sending can be performed.

Figure 10:
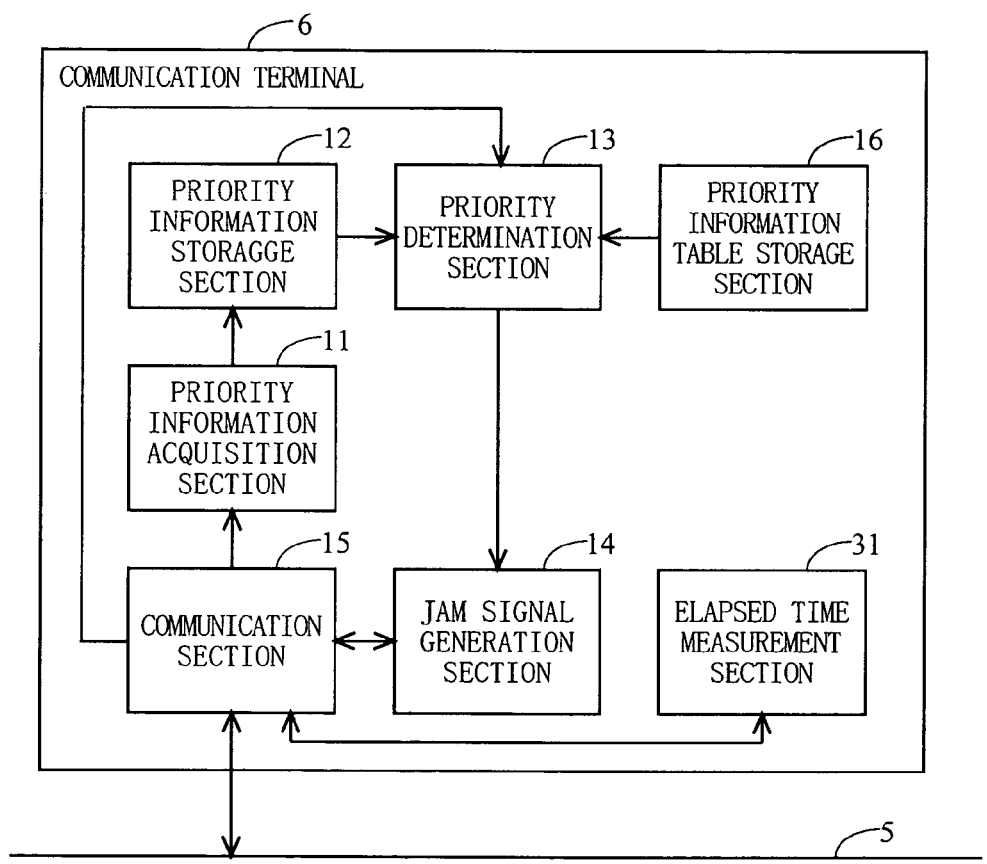
FIG. 10 is a block diagram illustrating a configuration of a communication terminal according to a third embodiment.

FIG. 10 is a block diagram illustrating a configuration of the communication terminal according to the third embodiment. Note that in FIG. 10 the same components as those shown in FIG. 2 are designated by the same reference numerals, and the description thereof will be omitted. A communication terminal 6 shown in FIG. 10 is different from the communication terminal 1 shown in FIG. 2 in that an elapsed time measurement section 31 is further provided. The elapsed time measurement section 31 measures the time period over which the currently transmitting packet is sent, i.e., the elapsed time from when the currently transmitting packet is sent out on the transmission medium.

Figure 11:
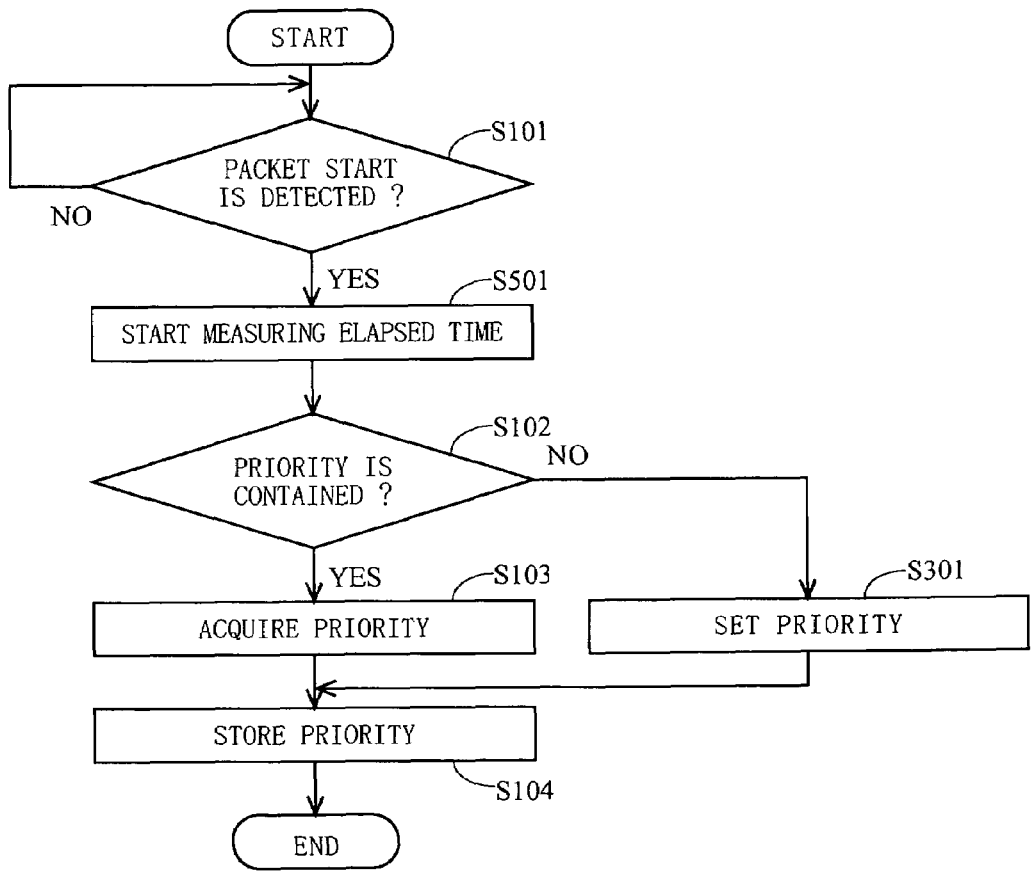
FIG. 11 is a flowchart showing the flow of processing related to receiving a packet in the third embodiment, which is performed by the communication terminal.

FIG. 11 is a flowchart showing the flow of processing related to receiving a packet in the third embodiment, which is performed by the communication terminal 6. Note that in FIG. 11 the steps indicating the same operations as those in FIGS. 3 and 8 are designated by the same step numbers, and the description thereof will be omitted. In the third embodiment, if the determination at step S101 is affirmative, the communication section 15 notifies the elapsed time measurement section 31 of the determination result. In response to this, the elapsed time measurement section 31 starts measuring an elapsed time (step S501) After step S501, the process of step S102 is performed.

Figure 12:
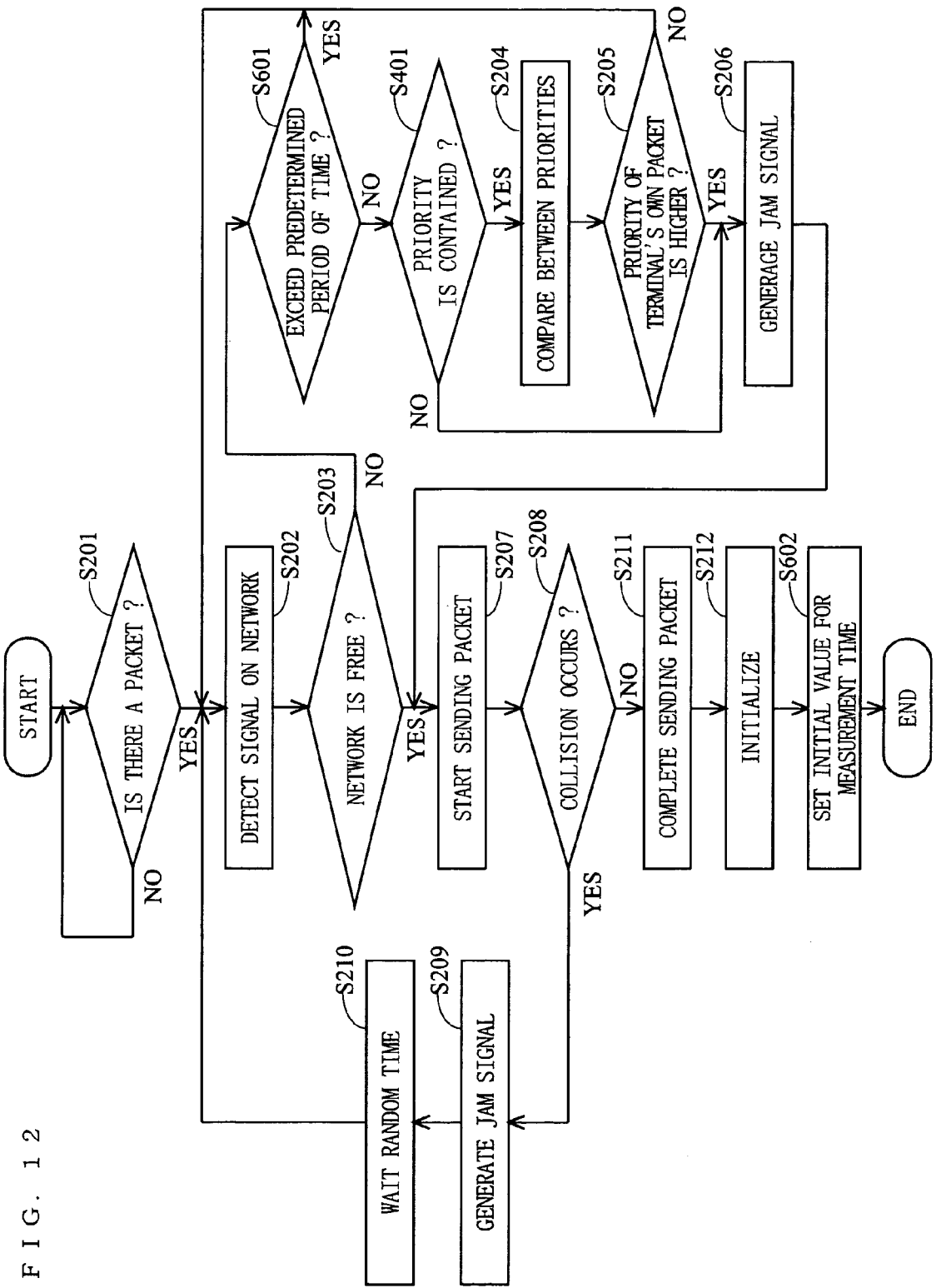
FIG. 12 is a flowchart showing the flow of processing related to sending a packet in the third embodiment, which is performed by the communication terminal.
Figure 13:
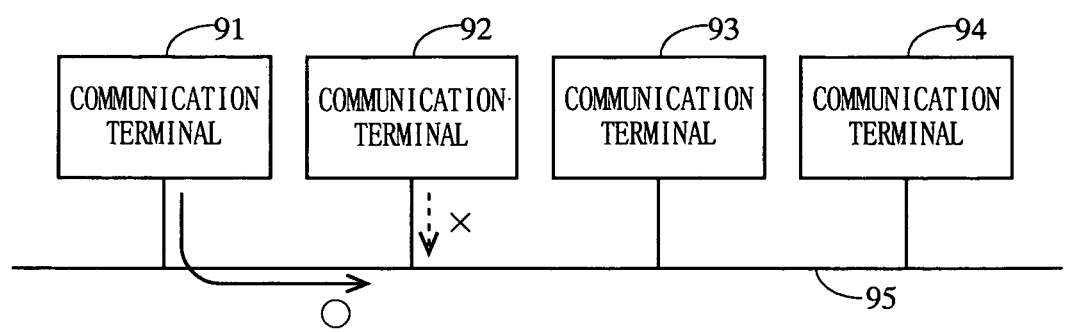
FIG. 13 is a diagram for describing a method of sending a packet in a conventional network system.

FIG. 12 is a flowchart showing the flow of processing related to sending a packet in the third embodiment, which is performed by the communication terminal 6. Note that in FIG. 12 the steps indicating the same operations as those in FIGS. 5 and 9 are designated by the same step numbers, and the description thereof will be omitted. In the third embodiment, if the determination at step S203 is negative, the communication section 15 notifies the elapsed time measurement section 31 of the determination result. In response to this, the elapsed time measurement section 31 determines whether the elapsed time being measured exceeds a predetermined period of time (step S601). Here, the predetermined period of time is preferably set to a period of time in which the sending of the currently transmitting packet is considered to be almost completed. For example, the case is assumed where an IP packet is encapsulated in an Ethernet (R) packet on a 1500-byte basis and sent. In this case, the predetermined period of time may be set to 1.2 (msec), for example. The time period of 1.2 (msec) is the time required to send data of 1500 bytes at 10 (Mbps (bit per second)). That is, at the time when the time period of 1.2 (msec) is elapsed from when the packet is sent, the rest of the data (a portion of the data in the entire packet which has not been sent) is only an Ethernet(R) packet portion, and thus it is expected that sending is almost completed. Note that the determination result at step S601 is notified to the communication section 15.

If it is determined at step S601 that the elapsed time exceeds the predetermined period of time, the communication section 15 performs the process of step S202. Specifically, if the sending of the currently transmitting packet is almost completed, the communication section 15 waits to send the to-be-sent packet until the sending of the currently transmitting packet has been completed. On the other hand, if it is determined that the elapsed time does not exceed the predetermined period of time, the priority determination section 13 performs the process of step S401. In this case, the same operation as that of the first and second embodiments is performed. Specifically, if the to-be-sent packet has a higher priority, the communication terminal 6 stops sending the currently transmitting packet and sends the to-be-sent packet first.

In addition, in the third embodiment, subsequent to step S212, the communication section 15 instructs the elapsed time measurement section 31 to set an initial value for the elapsed time (step S602). In response to this,the elapsed time measurement section 31 sets "0" for the elapsed time. In the case where the sending of the currently transmitting packet is stopped halfway and the to-be-sent packet is sent on a high-priority basis, at the time of performing the process of step S602, the elapsed time is still being measured. The process of step S602 is the process of stopping the measurement of the elapsed time and initializing the elapsed time.

As described above, according to the third embodiment, by determining whether sending of an already-sent packet (the currently transmitting packet) is almost completed, it is possible to prevent a packet whose sending operation is almost completed from being broken down. Accordingly, an efficient packet sending can be performed.

Note that in the third embodiment the predetermine period of time is set to 1.2 (msec), but is not particularly limited thereto. The predetermined period of time may be set to a time period required to send, for example, 50% of the data in the entire packet or 80% of the data in the entire packet. To reduce an unnecessary data transmission caused by stopping the sending of the currently transmitting packet, the predetermined period of time should be set to a short period of time. A specific numeric value set for the predetermined period of time can be determined based on the size of the packet, the transmission speed of the transmission medium, or the like.

In the third embodiment, the determination as to whether the elapsed time has exceeded a predetermined period of time is made to determine whether to perform packet sending according to priorities. Here, in another embodiment, the determination as to which one of the currently transmitting packet and the to-be-sent packet should be given priority may be made using the combination of an elapsed time and a priority. For example, a packet having a highest priority (e.g., "highest priority" shown in FIG. 6) may be always sent on a high-priority basis regardless of the elapsed time, while packets other than that packet may be sent according to priorities only when the elapsed time does not exceed a predetermined period of time. Further, although in the third embodiment the communication terminal initializes the elapsed time upon completion of sending the packet thereof, in another embodiment the communication terminal may stop measuring the elapsed time upon completion of sending a packet on the transmission medium, and then initialize the elapsed time.

Further, although in the foregoing third embodiment the elapsed time from when the currently transmitting packet is sent is measured, in another embodiment the amount of a portion of the data in the currently transmitting packet which has already been received may be measured. Namely, there may be provided a data-amount measurement section for measuring the amount of a portion of the data in the currently transmitting packet which has already been received, in place of the elapsed time measurement section 31. Specifically, at step S501, the data-amount measurement section starts measuring the amount of a portion of the data in the currently transmitting packet which has already been received. Then, at step S601, the data-amount measurement section determines whether the amount of data being measured exceeds a predetermined amount of data. Here, the predetermined amount of data is preferably set to an amount of data with which the sending of the currently transmitting packet is considered to be almost completed, as is the above-described predetermined period of time. In addition, in response to the notification from the communication section 15 at step S602, the data-amount measurement section sets "0" for the amount of data being measured. As described above, instead of measuring an elapsed time, even by measuring the amount of data having already been received, the same advantage as that obtained by the above-described third embodiment can be obtained.

As described above, according to the above-described first to third embodiments, a high priority packet can be sent over a LAN on a high-priority basis. Further, in the case where a high priority packet is already being sent, the packet can be sent without being broken down and thus a data transmission suitable for a real-time transmission can be performed.

Note that in the first to third embodiments the priority information uses the User-Priority field specified by IEEE 802.1p, but is not limited thereto. For example, a source address or a destination address shown in FIG. 4 may be used as priority information. In this case, the priority can be determined according to a communication terminal which is the source of the packet or a communication terminal which is the destination of the packet. In this case, each communication terminal needs to prepare a priority information table in which source addresses or destination addresses are associated with priorities (e.g., priority levels shown in FIG. 6). Although in the first to third embodiments the priority value is converted to the priority level and the determination as to priority is made based on the converted priority level (step S205), such a determination may be made based on the priority value. In this case, the priority information table is not necessary.

In the first to third embodiments, in the case where the communication terminal sends a to-be-sent packet, the packet is sent immediately after a jam signal is generated (step S207). Here, in another embodiment, sending of the to-be-sent packet may be performed before sending the currently transmitting packet whose sending operation is stopped by a jam signal. That is, the sending of the to-be-sent packet may start within a random time in which other communication terminals are in a wait state.

In the first to third embodiments, if the to-be-sent packet has a lower priority than the currently transmitting packet (if the determination at step S205 is negative), the communication terminal waits to send the to-be-sent packet until the transmission medium becomes free. Here, in another embodiment, if the determination at step S205 is negative, the communication terminal may start sending the to-be-sent packet after having waited a random time. In addition, although in the first to third embodiments at step S210 the communication terminal waits a random time to send the to-be-sent packet, in another embodiment the communication terminal may wait to send the to-be-sent packet until the transmission medium becomes free.

In the first to third embodiments, the random time at step S210 is randomly set for each communication terminal and the time range to be taken as the random time is common for all communication terminals. Here, in another embodiment, the range to be taken as the random time may be changed according to the priority of a packet to be sent. Specifically, the communication terminal may set the range to be taken as the random time such that the possibility that the range to be taken as the random time is shortened increases as the priority of the to-be-sent packet gets higher. By this, the higher the priority of the packet is, the shorter the wait time of the packet becomes, and thus advantages are provided that an unnecessary data transmission and an unnecessary priority determination process can be minimized. The advantages will be described below.

For example, suppose the case where there are a plurality of communication terminals being in a random-time wait state. In this case, if the range to be taken as the random time is the same for all the communication terminals, there is a possibility that a communication terminal which sends a low priority packet may start sending the packet first. However, even if the communication terminal which sends a low priority packet starts sending the packet first, if, after the sending of the packet, another communication terminal (a communication terminal which sends a higher priority packet) attempts to start sending the packet, the sending of the packet whose sending operation is started first is stopped. Therefore, the sending of the packet whose sending operation is started first results in an unnecessary data transmission. In addition, upon start of packet sending by another communication terminal, a priority determination process is performed. Here, by setting the range such that the higher the priority of the packet, the shorter the time to be taken as the random time, the probability that the communication terminal which sends a low priority packet starts sending the packet first can be made small (or can be made 0). Accordingly, an unnecessary data transmission such as that described above is avoided. Specifically, in the case where the random time range for a communication terminal which sends a low priority packet is set to "a" to "b" (msec) and the random time range for a communication terminal which sends a high priority packet is set to "c" to "d" (msec), each communication may set "a" to "d" such that "a" to "d" has the following relationship, for example. Specifically, each communication terminal may set "a" to "d" such that a<b<c<d. In this case, the probability that the communication terminal which sends a low priority packet starts sending the packet first becomes "0". Alternatively, each communication terminal may set "a" to "d" such that a<c<b<d.

Note that regarding packet reception processing, there is no description in the first to third embodiments about processing of a packet addressed to the communication terminals 1 and 6 or about abnormal processing such as processing performed upon reception of a broken packet, but such processing operations may be performed by conventional methods.

As described above, the present invention can be applied to a network system aiming to reliably send a high priority packet.

While the invention has been described in detail, the foregoing description is in all aspects illustrative and not restrictive. It is understood that numerous other modifications and variations can be devised without departing from the scope of the invention.

What is claimed is:

1. A packet communication terminal for use in a network system, wherein the network system includes a plurality of communication terminals connected to a single transmission medium, a packet to be sent out on the transmission medium for communication between the communication terminals contains priority information about a priority for sending the packet, and said packet communication terminal comprises:

a priority information acquisition section for acquiring priority information contained in a currently transmitting packet being sent out on the transmission medium to a first communication terminal;

a first priority determination section for determining which one of a to-be-sent packet and the currently transmitting packet is to be given priority based on priority information contained in the to-be-sent packet which is to be sent to a second communication terminal from said packet communication terminal and the priority information acquired by said priority information acquisition section;

an elapsed time measurement section, which has information pertinent to a predetermined time indicating a time during which sending of the to-be-sent packet is given priority over sending of the currently transmitting packet, for measuring an elapsed time starting from when the currently transmitting packet is sent out on the transmission medium and for determining whether or not the elapsed time exceeds the predetermined time;

a second priority determination section for determining that the currently transmitting packet is given priority if the first priority determination section determines that the to-be-sent packet is given priority and if the elapsed time measurement section determines that the elapsed time exceeds the predetermined time;

a jam signal generation section for generating a jam signal for causing a packet collision on the transmission medium if the first and second priority determination sections determine that the to-be-sent packet is given priority; and a packet sending out section for, if the first and second priority determination sections determine that the to-be-sent packet is given priority, sending out the to-be-sent packet on the transmission medium after the jam signal stops and before the currently transmitting packet is sent out again, and for, if the first and second priority determination sections determine that the currently transmitting packet is given priority, sending out the to-be-sent packet after completing sending of the currently transmitting packet.

2. The packet communication terminal according to claim 1, wherein a non-priority communication terminal sends out a packet which does not contain priority information on the transmission medium, and said first priority determination section sets a priority for the currently transmitting packet to a predetermined level, and then determines which one of the to-be-sent packet and the currently transmitting packet is to be given priority, if the currently transmitting packet does not contain priority information.

3. The packet communication terminal according to claim 1, wherein:

the priority information indicates a priority for sending a packet; and said first priority determination section determines, between the to-be-sent packet and the currently transmitting packet, a packet having a higher priority as the packet to be given priority.

4. The packet communication terminal according to claim 1, wherein:

the priority information is contained in a packet and indicates a destination communication terminal or a source communication terminal;

each communication terminal further includes a priority information table storage section for storing a priority information table which shows association between the priority information and a priority of a packet which contains the priority information; and said first priority determination section derives priorities of the to-be-sent packet and the currently transmitting packet using said priority information table, and then determines one of the to-be-sent packet and the currently transmitting packet as having a higher priority and that priority is to be given to the one of the to-be-sent packet and the currently transmitting packet having the higher priority.

5. The packet communication terminal according to claim 1, wherein if a jam signal is sent out on the transmission medium by a third communication terminal while the to-be-sent packet is being sent out, said packet sending out section sends out the to-be-sent packet after each communication terminal has waited a respective random time.

6. The packet communication terminal according to claim 5, wherein a range of the random time is set such that a possibility that said random time becomes short as the priority of the to-be-sent packet increases.

7. The packet communication terminal according to claim 1, wherein said packet sending out section waits until there is no currently transmitting packet on the transmission medium, and then sends out the to-be-sent packet if another jam signal is sent out on the transmission medium by a third communication terminal while the to-be-sent packet is being sent out.

8. A packet communication terminal for use in a network system, wherein the network system includes a plurality of communication terminals connected to a single transmission medium, a packet to be sent out on the transmission medium for communication between the communication terminals contains priority information about a priority for sending the packet, and said packet communication terminal comprises:

a priority information acquisition section for acquiring priority information contained in a currently transmitting packet being sent out on the transmission medium to a communication terminal;

a first priority determination section for determining which one of a to-be-sent packet and the currently transmitting packet is to be given priority based on priority information contained in the to-be-sent packet which is to be sent to another communication terminal from said packet communication terminal and the priority information acquired by said priority information acquisition section;

a data-amount measurement section, which has information pertinent to a predetermined amount of data, for measuring an amount of a portion of data in the currently transmitting packet which has been received and for determining whether or not the amount of the portion of data exceeds the predetermined amount of data;

a second priority determination section for determining that the currently transmitting packet is given priority if the first priority determination section determines that the to-be-sent packet is given priority and if the data-amount measurement section determines that the amount of the portion of data exceeds the predetermined amount of data;

a jam signal generation section for generating a jam signal for causing a packet collision on the transmission medium if the first and second priority determination sections determine that the to-be-sent packet is given priority; and a packet sending out section for, if the first and second priority determination sections determine that the to-be-sent packet is given priority, sending out the to-be-sent packet on the transmission medium after the jam signal stops and before the currently transmitting packet is sent out again, and for, if the first and second priority determination sections determine that the currently transmitting packet is given priority, sending out the to-be-sent packet after completing sending of the currently transmitting packet.

9. A method of sending a packet in a network system, wherein the network system includes a plurality of communication terminals connected to a single transmission medium, a packet to be sent out on the transmission medium for communication between the communication terminals contains priority information about a priority for sending the packet, and the method is performed by a communication terminal by sending a to-be-sent packet to another communication terminal and comprises:

acquiring priority information contained in a currently transmitting packet being sent out on the transmission medium;

a first priority determining step of determining which one of the to-be-sent packet and the currently transmitting packet is to be given priority based on priority information contained in the to-be-sent packet and the acquired priority information;

measuring an elapsed time starting from when the currently transmitting packet is sent out on the transmission medium and determining whether or not the elapsed time exceeds a predetermined time;

a second priority determining step of determining that the currently transmitting packet is given priority if said first priority determining step determines that the to-be-sent packet is given priority and if it is determined that the elapsed time exceeds the predetermined time;

generating a jam signal for causing a packet collision on the transmission medium if said first and second priority determining steps determine that the to-be-sent packet is given priority;

sending out, if said first and second priority determining steps determine that the to-be-sent packet is given priority, the to-be-sent packet on the transmission medium after the jam signal stops and before the currently transmitting packet is sent out again; and sending out, if said first and second priority determining steps determine that the currently transmitting packet is given priority, the to-be-sent packet after completing sending of the currently transmitting packet.

10. A method of sending a packet in a network system, wherein the network system includes a plurality of communication terminals connected to a single transmission medium, a packet to be sent out on the transmission medium for communication between the communication terminals contains priority information about a priority for sending the packet, and the method is performed by a communication terminal by sending a to-be-sent packet to another communication terminal and comprises:

acquiring priority information contained in a currently transmitting packet being sent out on the transmission medium;

a first priority determining step of determining which one of the to-be-sent packet and the currently transmitting packet is to be given priority based on priority information contained in the to-be-sent packet and the acquired priority information;

measuring an amount of a portion of data in the currently transmitting packet which has been received and determining whether or not the amount of the portion of data exceeds a predetermined amount of data;

a second priority determining step of determining that the currently transmitting packet is given priority if said first priority determining step determines that the to-be-sent packet is given priority and if it is determined that the amount of the portion of data exceeds the predetermined amount of data;

generating a jam signal for causing a packet collision on the transmission medium if said first and second priority determining steps determine that the to-be-sent packet is given priority;

sending out, if said first and second priority determining steps determine that the to-be-sent packet is given priority, the to-be-sent packet on the transmission medium after the jam signal stops and before the currently transmitting packet is sent out again; and sending out, if said first and second priority determining steps determine that the currently transmitting packet is given priority, the to-be-sent packet after completing sending of the currently transmitting packet.

11. A computer program recorded on a computer-readable recording medium that is readable by a computer of a packet communication terminal included in a network system, wherein the network system includes a plurality of communication terminals connected to a single transmission medium, a packet to be sent out on the transmission medium for communication between the communication terminals contains priority information about a priority for sending the packet, and said program is for causing the computer to execute at least the following:

acquiring priority information contained in a currently transmitting packet being sent out on the transmission medium to a communication terminal;

a first priority determining operation of determining which one of the to-be-sent packet and the currently transmitting packet is to be given priority based on priority information contained in a to-be-sent packet which is to be sent to another communication terminal from the packet communication terminal and the priority information acquired during said acquiring operation;

measuring an elapsed time starting from when the currently transmitting packet is sent out on the transmission medium and determining whether or not the elapsed time exceeds a predetermined time;

a second priority determining operation of determining that the currently transmitting packet is given priority if said first priority determining operation determines that the to-be-sent packet is given priority and if it is determined that the elapsed time exceeds the predetermined time;

generating a jam signal for causing a packet collision on the transmission medium if said first and second priority determining operations determine that the to-be-sent packet is given priority;

sending out, if said first and second priority determining operations determine that the to-be-sent packet is given priority, the to-be-sent packet on the transmission medium after the jam signal stops and before the currently transmitting packet is sent out again; and sending out, if said first and second priority determining operations determine that the currently transmitting packet is given priority, the to-be-sent packet after completing sending of the currently transmitting packet.

12. A computer program recorded on a computer-readable medium that is readable by a computer of a packet communication terminal included in a network system, wherein the network system includes a plurality of communication terminals connected to a single transmission medium, a packet to be sent out on the transmission medium for communication between the communication terminals contains priority information about a priority for sending the packet, and said program is for causing the computer to execute at least the following:

acquiring priority information contained in a currently transmitting packet being sent out on the transmission medium to a communication terminal;

a first priority determining operation of determining which one of a to-be-sent packet and the currently transmitting packet is to be given priority based on priority information contained in the to-be-sent packet which is to be sent to another communication terminal from the packet communication terminal and the priority information acquired during said acquiring operation;

measuring an amount of a portion of data in the currently transmitting packet which has been received and determining whether or not the amount of the portion of data exceeds a predetermined amount of data;

a second priority determining operation of determining that the currently transmitting packet is given priority if said first priority determining operation determines that the to-be-sent packet is given priority and if it is determined that the amount of the portion of data exceeds the predetermined amount of data;

generating a jam signal for causing a packet collision on the transmission medium if said first and second priority determining operations determine that the to-be-sent packet is given priority; and sending out, if said first and second priority determining operations determine that the to-be-sent packet is given priority, the to-be-sent packet on the transmission medium after the jam signal stops and before the currently transmitting packet is sent out; and sending out, if said first and second priority determining operations determine that the currently transmitting packet is given priority, the to-be-sent packet after completing sending of the currently transmitting packet.

* * * * *